July 16, 1957 C. A. LOVELL 2,799,729

MULTIFREQUENCY HIGH SPEED CALLING SIGNAL GENERATOR

Filed May 27, 1953 3 Sheets-Sheet 1

INVENTOR
C. A. LOVELL
BY William F. Simpson
ATTORNEY

July 16, 1957 C. A. LOVELL 2,799,729

MULTIFREQUENCY HIGH SPEED CALLING SIGNAL GENERATOR

Filed May 27, 1953 3 Sheets-Sheet 2

INVENTOR
C. A. LOVELL
BY William F. Lieupe
ATTORNEY

July 16, 1957 C. A. LOVELL 2,799,729

MULTIFREQUENCY HIGH SPEED CALLING SIGNAL GENERATOR

Filed May 27, 1953 3 Sheets-Sheet 3

INVENTOR
C. A. LOVELL
BY William F. Simpson.
ATTORNEY

United States Patent Office 2,799,729

Patented July 16, 1957

2,799,729

MULTIFREQUENCY HIGH SPEED CALLING SIGNAL GENERATOR

Clarence A. Lovell, Summit, N. J., assignor to Bell Telephone Laboratories, Incorporated, New York, N. Y., a corporation of New York Application May 27, 1953, Serial No. 357,727

4 Claims. (Cl. 179—90)

This invention relates to calling systems and more particularly to improved methods, apparatus and equipment for multifrequency high speed signaling arrangements which may be readily employed in telephone and other calling systems.

More particularly, this invention is a continuation-in-part of my copending application Serial No. 1,471, filed January 9, 1948, which issued November 3, 1953, as Patent 2,658,189, and relates to an improved calling arrangement suitable for use in combination with receiving apparatus set forth in my said copending application Serial No. 1,471, filed January 9, 1948.

That application discloses a multifrequency calling arrangement wherein voice frequency signals representing a multisymbol or a multidigit identification or subscriber's number is transmitted from a calling station to a receiving device, which device is usually located at a central switching point. In the above-identified application the identity of each of the symbols or digits is represented by two out of five different frequencies in the voice frequency range.

The same type of signaling arrangement is employed in the present calling arrangement. This invention relates to a subscriber's station and equipment and methods of operation thereof. The subscriber's station is suitable for readily transmitting groups of such controlling signals over a subscriber's line to a central control or switching station.

An object of the present invention is to provide the improved subscriber's station set and control equipment and methods of operation thereof to transmit signals to a receiving station more accurately, faster and at less expense.

Another object is to provide means in such an improved signaling system for controlling this equipment in such a manner that the called station identification may be manually set up on the equipment and the setting of the equipment checked prior to placing the call. Thereafter, a call is placed and the signals representing the called subscriber's station designation repeatedly transmitted for as long an interval of time as may be desirable or required to establish a connection to the called line or station.

A feature of this invention relates to motor-driven apparatus at the subscriber's station for selectively connecting circuits to a transmission path in accordance with the identity of the symbols or numerals designating a called station.

Another feature of this invention relates to motor-driven contacts for abruptly applying potential to resonant circuits to shock-excite said circuits so that they will deliver sufficient alternating-current power over the line to be recognized and detected.

Another feature of this invention relates to motor-driven apparatus for timing the multifrequency signals transmitted to the central switching station.

Still another feature of this invention relates to apparatus and equipment for repeatedly damping and dissipating the energy in the resonant circuit when it is desired to stop oscillations.

The foregoing objects and features of this invention may be more readily understood from the following description when read with reference to the drawing in which:

Figs. 1 through 4, inclusive, show in detail the structural features of a calling switch which is settable by the calling subscriber in accordance with the symbols or numerals to be represented by the transmitted signals.

More particularly, Fig. 1 shows a front elevation of such a dial or settable device;

Figure 5:
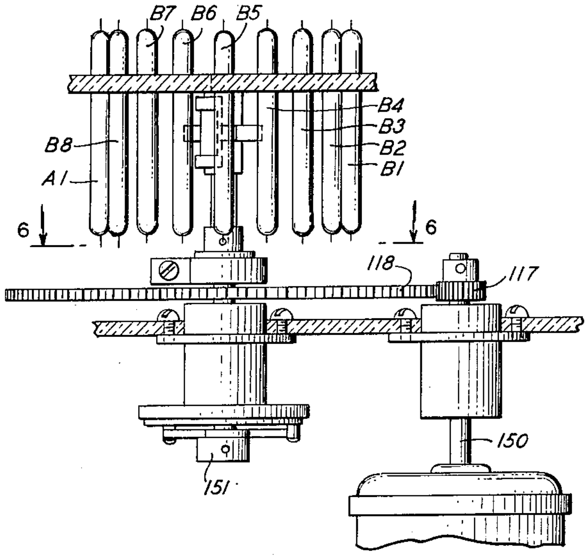
Figs. 5 through 7 and Fig. 8 illustrate the construction of the motor-driven commutator employing reed-type switches, that is, hermetically sealed in an inert atmosphere such as argon.
Figure 6:
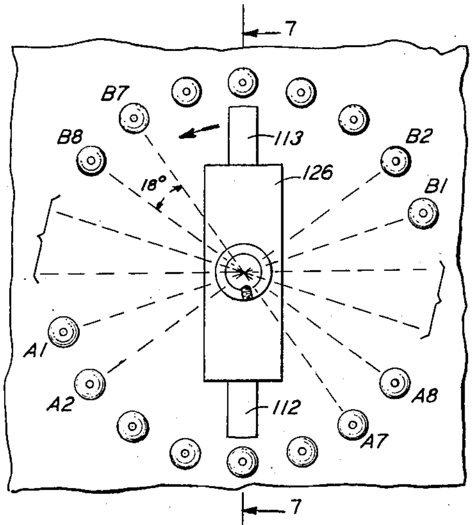
Figure 7:
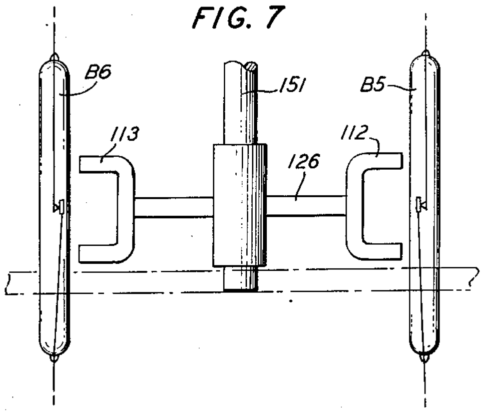
Figure 8:
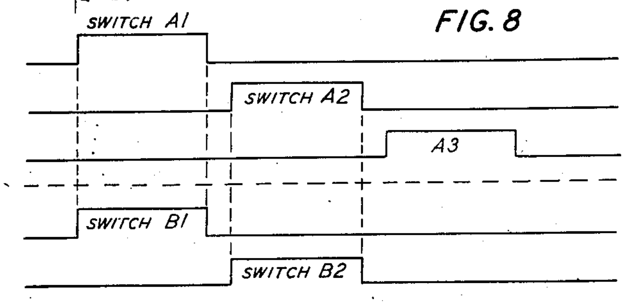
Figures 9, 10:
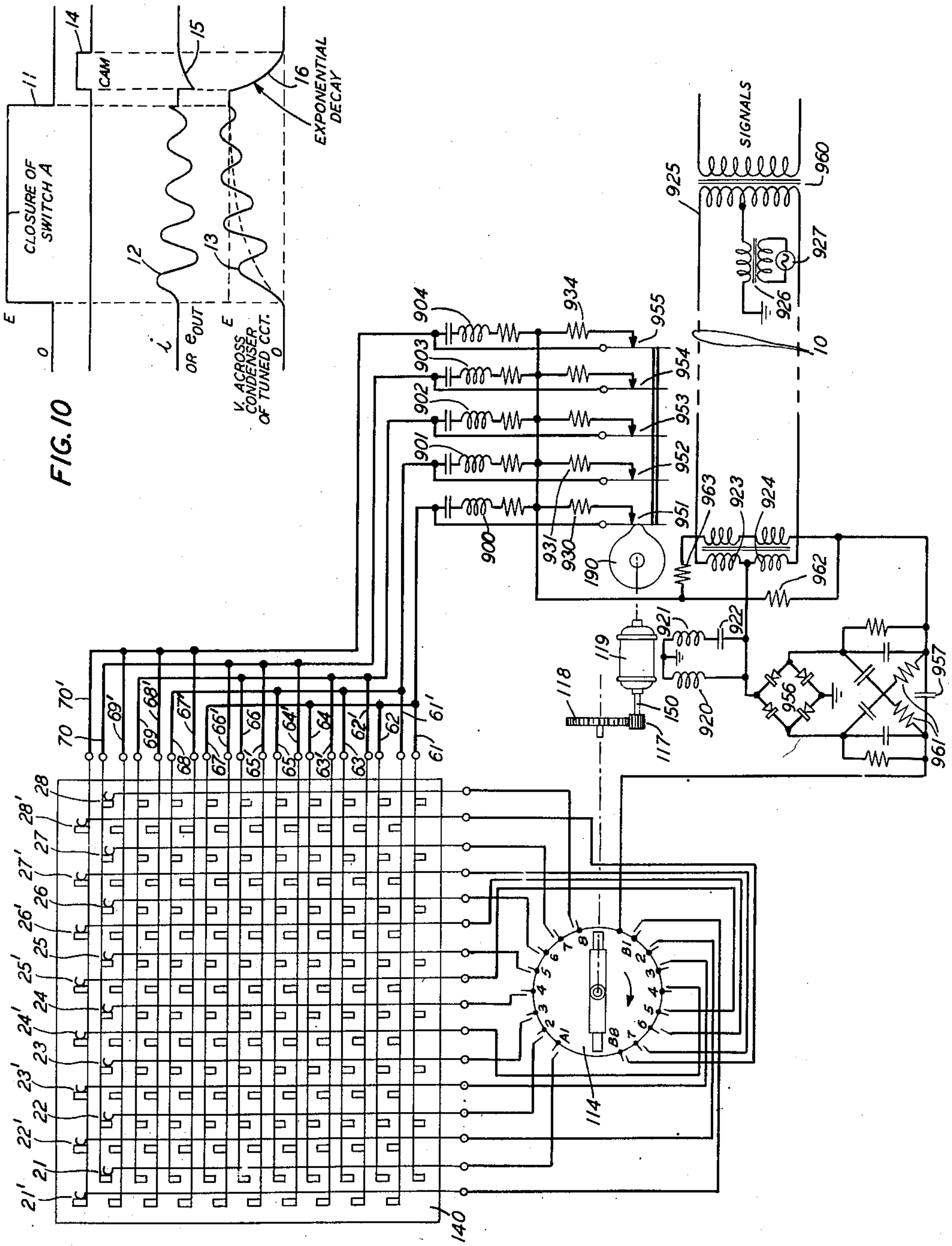

More particularly, Fig. 5 shows the top view of such a switching arrangement;

Fig. 6 shows a partly sectional view along line 6—6 of Fig. 5;

Fig. 7 shows a side view along line 7—7 of Fig. 6;

Fig. 8 shows a number of graphs illustrating the time at which certain ones of the reed-type switches are closed by the commutator mechanism;

Fig. 9 shows in detail the circuits interconnecting the various component elements of applicant's improved switching arrangement; and Fig. 10 shows a number of graphs illustrating the operation of the circuits for generating pulses.

The signal transmitting equipment located at the subscriber's station in accordance with the present invention has been devised to transmit code combinations of different voice frequency signaling currents. It is to be understood, of course, that the invention does not require that voice frequency currents be employed. Instead, signaling currents of any desired frequencies may be employed.

In the exemplary embodiment of this invention set forth herein signaling arrangements are employed which transmit a plurality of signals which satisfy the equations $$\int_0^\tau \theta_i(\lambda)\cdot\theta_j(\tau-\lambda)d\lambda=0, i\neq j \quad (2a)$$

$$\int_0^\tau \theta_i(\lambda)\cdot\theta_j(\tau-\lambda)d\lambda=1, i=j \quad (2b)$$

where $\theta_1(t)$, $\theta_2(t)$ . . . $\theta_n(t)$ represent a plurality of signaling functions which conform to or satisfy the above Equations $2a$ and $2b$. As pointed out in the above-identified copending Lovell application Serial No. 1,471, the use of shock-excited oscillations which have a predetermined decrement when applied to selective circuits or filters having a similar dissipation constant produce one of two different results. When the frequency of the applied shock-excitations is different from that for which the filter is designed the output of the filter will be substantially zero at the end of a predetermined interval of time $\tau$ while the output will be of finite value when the applied alternating-current wave has the same frequency for which the filter is designed. This output exists at the ends of the same time interval $\tau$ as set forth in my above-identified copending application.

Referring first to the system drawing shown in Fig. 9, 140 represents the manually settable devices or dials, the structure of which is shown in Figs. 1, 2, 3 and 4. The distributor device 114 represents the motor-driven distributor device shown in detail in Figs. 5, 6 and 7. In addition, the motor 119 is provided for rotating motor-driven distributor device 114 and also cams 150 which cams control contacts 951, 952, 953, 954 and 955. A subscriber's line circuit 10 is shown extending from the subscriber's station equipment to a distant control switching point.

A polyphase alternating-current motor 119 is shown in Fig. 9. Two or more currents having different phases are employed to run motor 119. The alternating currents of different phases are obtained from phase shifting networks including the windings 920 and 921 of motor 119 and condenser 922. These windings are connected between ground and the center point of the windings 923 and 924 of a coupling transformer. The windings of the coupling transformer are connected in such a manner that the effect of the current flowing between the center point of these windings and ground is substantially cancelled out of the core of this transformer. With the low frequency power flux substantially balanced out of the core of this transformer, the transformer may be designed to most effectively transmit the pulse signals with the result that the cost of this transformer is reduced and at the same time the improved speed of transmission is obtained. At the distant or receiving end, a second tapped transformer is provided wherein the center tap is connected to one terminal of the winding of transformer 926. The other terminal of the winding of transformer 926 is connected to ground. Thus, an alternating current from source 927 is applied equally to both of the line conductors and, therefore, balances out in the transformer 925 and also balances out of the pulsing and oscillating circuits as described herein.

The application of power from source 927 to the subscriber's line causes motor 119 to be set into operation and advance both the cams 190 and the distributor device 114, though at different rates, as will be explained. As the motor 119 rotates the permanent magnet structure of the distributor device, the contacts A1, B1; 2—2, 3—3, etc. are closed successively as the arm carrying the permanent magnets rotates adjacent each pair of these contacts as set forth hereinafter.

A group of five resonant circuits 900, 901, 902, 903 and 904 are provided for generating the currents of the desired frequencies. Furthermore, a group of resistors 930, 931 through 934 is provided for rapidly damping out any oscillations within any of the resonant circuits so that the oscillations within these circuits may be rapidly dissipated.

In addition, a full wave rectifier bridge 956 is provided and connected between the center points of the windings 923 and 924 and ground, thereby having an alternating voltage supplied to it. As a result of rectification, a direct-current voltage is built up and maintained across condenser 957. The lattice-type network of resistor and capacitor elements interposed between the bridge rectifier and condenser 957 serves to smooth the rectified voltage and suppress the alternating voltage components before they reach the condenser 957. The energy stored in condenser 957 is subsequently used to shock-excite the circuits during partial discharge of the condenser.

Figures 1, 2, 3, 4:
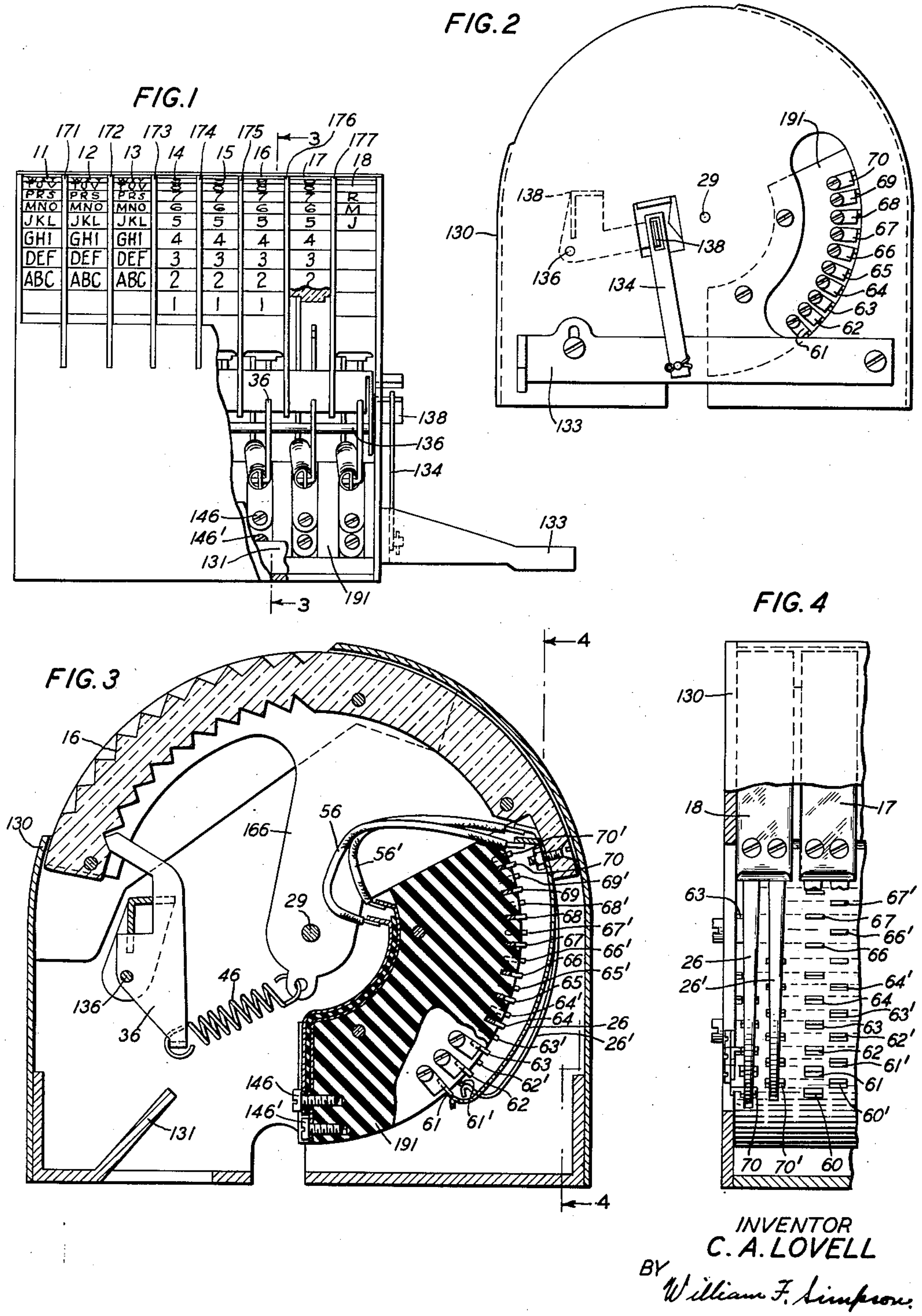
Fig. 2 shows an end view of the same device.
Fig. 3 shows a partially sectional view along line 3—3 of Fig. 1.
Fig. 4 shows a partially sectional view of Fig. 3 taken along line 4—4.

Figs. 1, 2, 3 and 4 show one embodiment of the selector switch 140, which is enclosed in case 130, with selector dials 11 to 18 and release lever 133 accessible to an operator. The selector dials are made of a non-conducting material such as hard rubber or plastic, and each dial is provided with ten indentations along its outer periphery. Each indentation is designated by a letter or number conforming to the telephone signaling system, and each is of suitable configuration to permit an operator's finger to engage and move the dial. The selector dials are separated by spacers 171 to 177 which are attached to case 130. As indicated in Fig. 3, each dial is attached to an individual support 166 so that each dial may be moved approximately one-fourth of a revolution about shaft 29. The inner surface of each dial is provided with ten grooves or notches which correspond to the finger indentations on the outer periphery of the dial. The grooves on each dial serve to engage with a detent pawl, to secure each dial in one of the ten possible positions as selected by the operator. As indicated in Fig. 3, detent pawl 36 which corresponds to dial 16 is pivoted about shaft 136. Spring 46 is attached between support 166 and pawl 36 so that pawl 36 is normally forced against dial 16, thereby securing the dial in a fixed position by engaging with one of the ten notches. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentations in a dial an operator can move the dial in either direction and so that the ratchet action of the pawl against the notches secures the dial in any one of the ten positions to which it may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 133 is depressed, arm 138 is moved in a clockwise direction as seen in Figs. 2 and 3 about shaft 136 and the detent pawls are disengaged from the dials, thereby permitting the spring associated with each dial to cause each dial to return to its initial position.

In order to provide for simultaneously connecting two resonant circuits, two contact members are provided for each of the selector or dial members 11 through 18. These contact members are illustrated in Figs. 3 and 4 by springs 26 and 26′ and are connected by means of flexible leads or wires 56 and 56′ to the corresponding terminals or screws 146 and 146′. Each of the springs 26 is arranged to make contact with one of the bus bars 61 through 70, inclusive, and each spring 26′ is arranged to make contact with bus bars 61′ through 70′. Thus in any position of the associated finger-wheel or dial such as 16 of Fig. 3, brush or contact member 26 will make contact with one of the bus bars 61 through 70 and brush or contact member 26′ will make contact with the corresponding bus bars 61′ through 70′. The insulating member 191 extends along the rear of the selector mechanism and supports two sets of two bus bars 61 through 70 and 60′ through 70′ as indicated in the drawings. In this way connections are made between the proper resonant circuits and the distributor mechanism shown in Figs. 5, 6 and 7 and illustrated in Fig. 9 by the contacts A1 to A8 and B1 to B8, inclusive.

The distributor mechanism indicated generally at 114 in Fig. 9 is shown in greater detail in Figs. 5, 6 and 7. The polyphase motor 119 is actuated by power transmitted over the subscriber's line and causes shaft 150 to rotate. The supply frequency together with the construction of the motor is such that the shaft 150, when running at normal speed, makes one revolution in the time allotted for the transmission of each of the successive symbols or numerals of a complete subscriber's designation. This shaft is coupled to shaft 151 through the gears 117 and 118. The gear ratio is such that the shaft 151 makes one revolution for each complete multisymbol or multidigit subscriber's station designation, the time for said revolution also including a period of specified length during which no signals are sent, as hereinafter explained.

Shaft 151 has mounted upon it a transverse member 126 each end of which supports the respective permanent magnets 112 and 113. As these magnets 112 and 113 are rotated by shaft 151 they are moved adjacent to individual ones of two groups of enclosed reed-type relay switches such as disclosed in Patents 2,289,830, granted to W. B. Ellwood, July 14, 1942, and 2,506,414, granted to W. B.

Ellwood, May 2, 1950, for example. As each magnet approaches one of these reed contact switches A1 through A8, inclusive, and B1 through B8, inclusive, its contacts are closed due to the magnetic field set up by magnets 112 and 113. As indicated in Fig. 8, switch A1 closes at the same time switch B1 closes and a short interval of time later switches A2 and B2 simultaneously close. Thus, a pair of switches, that is, one switch in the A group and one switch in the B group are closed at the same time and the switches in each group are closed in succession, thus connecting the contacts of the finger-wheel in succession at the subscriber's line extending to the central station. As shown in Fig. 8 each set or pair of these contacts opens before the next succeeding group or pair of contacts is closed. Thus, the switching contacts A1 through A8 and B1 through B8 must remain closed for a period of time greater than the selected time interval $\tau$ determined in accordance with Equations 2*a* and 2*b*. In this manner the transmitted signals are accurately timed. In addition, all of the contacts should remain open sufficiently long for cam 190 to close contacts 951 through 955, discharge all the energy stored in the resonant circuits and then for cam 190 to reopen contacts 951 through 955.

In operating the calling device in accordance with this invention the subscriber will first position the dials or finger-wheels 11 through 18, inclusive, in accordance with the digits, characters or symbols of the called subscriber's station designation or number. This designation or number should then appear right above the edge of the case 130 of the calling device. The subscriber can then check the accuracy of the setting of the device and if the subscriber has made any errors, the subscriber may either set the individual finger-wheels to correct the error or the subscriber may actuate the resetting lever 133 and then start over again. In any event, when the subscriber has accurately positioned the finger-wheels and checked the accuracy of the setting of these devices the subscriber may then place a call.

Actuation of the selecting devices or finger-wheels 11 through 18 causes the spring members 21 through 28 and 21' through 28' to connect and make contact with bus bars 61 through 70 and 61' through 70'. In this manner the pairs of the resonant circuits 900 through 904 are selectively connected to contacts of the distributor mechanism 114. Upon the initiation of a call, the equipment at the subscriber's station will be conditioned and connected as shown in Fig. 9 in the drawing. Likewise, the equipment at the central station will be actuated to apply the source of current 927 to the subscriber's line for actuating motor 119. In addition, a signal receiver will be connected to the subscriber's line in any suitable manner such as through the coupling transformer 960.

Suitable switching equipment at the subscriber's station is disclosed in a patent application of Hill-Parkinson, Serial No. 115,016, filed September 10, 1949, which issued June 3, 1952, as Patent 2,598,695, and a patent application of Dunlap-Malthaner, Serial No. 116,068, filed September 16, 1949, which issued March 16, 1954, as Patent 2,672,523. Typical switching equipment at the central station which may be employed in cooperation with other circuits of applicant's invention is disclosed in a patent application of Malthaner-Vaughan, Serial No. 115,961, filed September 16, 1949, which issued October 13, 1953, as Patent 2,655,559. Of course, the receiver is designed to cooperate with the multifrequency signals generated by the subscriber's station equipment such as disclosed in my above-identified copending application Serial No. 1,471, filed January 9, 1948. Inasmuch as the equipment and circuits disclosed in the above-identified patent applications operate in the usual manner as described in said above-identified patent applications, descriptions of these circuits, systems and apparatus need not be repeated here, since reference may be made to said patent applications.

Upon the application of alternating-current power from source 927 to the subscriber's line, motor 119 is set into operation. While it is assumed in the description herein that motor 119 is a self-starting synchronous-operating motor, any other suitable type of motor including a direct-current motor, a shaded pole induction motor or other suitable type of motor may be employed.

Assume for purpose of illustration that the motor starts from the position shown in the drawing. As a result, cam 190 is rotated by the motor 119 and opens the contacts 951, 952, 953, 954 and 955 and thus removes the shunt resistance 930 through 934 from around the oscillating or resonant circuits 900 through 904.

In addition, the application of the alternating current 927 to the line extending to the subscriber's station also applies alternating current to the full wave rectifier bridge 956 and causes a direct-current voltage to be applied across the smoothing or filter condenser 957. This condenser is connected to the bridge 956 in any suitable manner including the necessary types of filter elements to reduce the ripple or hum voltage across the condenser 956 to a desired level. As shown in the drawing, a bridge or lattice-type circuit is employed to couple condenser 957 to the rectifier bridge 956. This bridge circuit may be adjusted to suppress most completely any desired frequency but is usually adjusted to the double frequency of the alternating current supplied since this frequency is the most predominant frequency in the output of the rectifier circuit when it is connected to a single phase supply as shown in the drawing. If desired, the resistors 961 may be omitted so that the bridge will operate over a somewhat wider range of frequencies and thus suppress higher harmonics more effectively.

Consequently, condenser 957 has acquired a charge and exhibits a direct-current voltage across its terminals by the time the distributor mechanism 114 has rotated the permanent magnets 112, 113 adjacent the respective contacts A1 and B1.

As a result of the closure of contacts A1 and B1 by means of a distributor mechanism 114 a direct-current voltage is abruptly applied to two of the resonant circuits. Assume, for example, that the spring members 21 and 21' associated with the first dial or finger-wheel 11 on the left have been actuated to the position shown in the drawing for making contact with the resonant circuits 903 and 904, the closure of the A1 and B1 contacts abruptly applies a voltage from condenser 957 across these resonant circuits. This circuit may be traced from the lower terminals of the resonant circuits and through resistor 962 to the right-hand terminal of condenser 957 and then from the left-hand terminal of condenser 957 through the A1 contacts and the left-hand dial contacts 21 to the resonant circuit 903. Likewise, similar circuits extend through the B1 contacts and the left-hand dial contacts 21' to the resonant circuit 904. The sudden application of a direct-current voltage from condenser 957 to these resonant circuits will give rise to oscillatory electrical current and electrical voltage components as well as electrical direct-current components. In other words, the sudden application of a voltage having a wave form of a step-function to these circuits causes a damped alternating current to flow through these circuits. The decrement or damping of the circuits is controlled by the amount of resistance in the circuits which includes both the individual resistances in the circuits as well as the resistance 962 and also, to a very small extent, resistance 963 and the resistance of the subscriber's line, as seen through the coupling coil. As explained in my above-identified copending application Serial No. 1,471, the decrement of the signaling current is adjusted in accordance with the properties of the receiving equipment at the central exchange. Resistor 962 is included in the circuit to provide a low resistance path for the oscillating currents to flow over and thus provide a suitable circuit for these currents to flow almost independently of the resistance, impedance or other transmission characteristics of the subscriber's line 10.

The voltage drop across this resistor 962 is applied to the subscriber's line through resistor 963 and the coupling transformer 924. The currents are then transmitted over line 10 and through coupling transformer 925 and then to signal receiving apparatus of the type disclosed in my above-identified application Serial No. 1,471.

After this alternating current flows for a sufficient interval of time, which should be greater than the time interval $\tau$, the magnets 112 and 113 pass beyond the contact members A1 and B2 and thus interrupt the above-described oscillating circuits. At about this time, cam 190 has made one revolution and again closes contacts 951 through 955, inclusive, which connects the resistors 930 through 934 across the resonant circuits to dissipate the charge which has accumulated on the condensers of the active tuned circuits during the oscillatory process because of the direct-current components of the applied step-function of voltage. Said resistors 930 through 934 are preferably high enough in resistance value to produce the desired dissipation of energy in a non-oscillatory manner, but low enough in value to accomplish the discharge quickly. A short interval of time later, after contacts 951 through 955 have reopened, the magnets 112 and 113 pass adjacent contact structures A2 and B2 which again apply a step-function of voltage or make sudden application of a voltage to the same or another pair of the resonant circuits whereupon alternating currents representing the identity, magnitude or character of the second symbol in the calling subscriber's station designation, according to the chosen code of pulses, is transmitted to the central switch station.

The operation of the resonant circuits in generating the voice frequency signaling pulses is further illustrated in Fig. 10. Curve 11 shows the closure of one of the distributor contacts such as A1. The closure of these contacts applies the voltage from the condenser 957 to one of the resonant circuits depending upon the setting of the switch element 21 of the selector 140. As a result, oscillating current flows in this resonant circuit as shown by curve 12 in Fig. 10. This oscillating current causes a corresponding voltage component to appear across the condenser in the resonant circuit. The composite voltage wave form across the condenser of the resonant circuit due to the oscillating current and due to the direct-current voltage from condenser 957 is illustrated by curve 13 in Fig. 10. After the switch A1 opens as shown in curve 11, the cam 190 closes as shown in curve 14 in Fig. 10. The closure of this cam causes the condenser in the resonant circuit to be discharged. The discharge current is illustrated at 15 of curve 12 in Fig. 10 while the exponential decay of voltage across the condenser in the resonant circuit is illustrated by the portion 16 of curve 13. The above-described operation is then repeated for each of the succeeding numerals, digits or symbols of the called subscriber's designation.

After currents representing the complete subscriber's designation have been transmitted, the distributor mechanism including magnets 112 and 113 is again in the position shown in Fig. 9 where none of the distributor contacts is closed. This condition persists for a time interval approximately equal to the time assigned for the transmission of currents representing two successive symbols or digits of the subscriber's station designation. As a result, a pause or blank signal is transmitted at this time which signal is employed to distinguish between the pulses representing the final digit of one transmission of the complete sequence of digits, and the first digit of the next succeeding full transmission of the complete subscriber's designations transmitted from a called subscriber's station.

The resistor 963 is connected in a path between the resonant circuits and the subscriber's line and this resistor together with resistor 962 are provided to reduce the effects of the different lengths in subscriber's lines on the oscillating circuits and currents flowing through them. In other words, the resistors 962 and 963 prevent variations in the subscribers' lines from materially affecting either the amplitude or the frequency of the oscillating currents generated within the resonant circuits 900 through 904.

It is thus apparent that the calling arrangement shown in Fig. 9 continues to transmit pairs of alternating-current pulses having different frequencies to represent the various symbols and numerals of a called station so long as alternating current is supplied to the subscriber's equipment over line 10 and so long as the subscriber desires to originate such a call signal. Upon the termination of a usage of the equipment the subscriber will restore his equipment to normal except that the dial wheels in the selecting device 140 may be maintained in their set positions so that in case the called line was busy the subscriber can again originate the same call signal a short interval of time later, with a minimum of effort.

It is to be understood that the above-described arrangements are illustrative of the application of the principles of the invention. Numerous other arrangements may be devised by those skilled in the art without departing from the spirit and scope of this invention.

What is claimed is:

1. A calling arrangement comprising in combination, a calling line, a calling station connected thereto including a motor, means for energizing said motor over said line, a plurality of resonant circuits for generating damped alternating currents of predetermined frequency and decrement, an inductance and a capacitor individual to and connected in each of said resonant circuits, a motor-driven distributor mechanism, manually selectable devices interconnected between said distributor mechanism and said resonant circuits and apparatus interconnected with said distributor mechanism and said manually settable devices for abruptly applying electrical energy derived from said line to at least one of said resonant circuits and means for transmitting the resultant damped alternating current over said line.

2. A calling arrangement comprising in combination, a calling line, a calling station connected thereto including a motor, means for energizing said motor over said line, a plurality of resonant circuits for generating damped alternating currents of predetermined frequency and decrement, a motor-driven distributor mechanism, manually selectable devices interconnected between said distributor mechanism and said resonant circuits and apparatus interconnected with said distributor mechanism and said manually settable devices for abruptly applying electrical energy derived from said line to at least one of said resonant circuits, means for transmitting the resultant damped alternating current over said line, and additional switch contacts controlled by said motor for dissipating the energy in said resonant circuits.

3. An electrical calling station comprising in combination, a motor, a motor-operated distributor device for successively closing a plurality of contacts, a plurality of resonant circuits each constructed to generate a damped alternating-current wave form of predetermined frequency and decrement, a plurality of manually settable devices interconnected between said distributor and said resonant circuits each for selectively interconnecting a predetermined number of said resonant circuits to said distributor and apparatus for abruptly applying electrical energy through said distributor and said manually settable devices to said selected resonant circuits, electrical impedance means connected in said resonant circuits, and apparatus for transmitting signaling currents over said calling line derived from said impedance means.

4. In a telephone calling arrangement, a calling line, an electrical motor, means for energizing said motor over said line, a plurality of resonant circuits for generating alternating currents of predetermined frequency and decrement, a plurality of manually settable devices each for selecting a fixed number of said resonant circuits, a distributor mechanism driven by said motor for successively establishing connections to each of said manually settable devices and apparatus for abruptly applying electrical energy through said distributor and said manually settable devices to the selected resonant circuits, an electrical resistive impedance connected to said resonant circuits, transmitting means for conveying signaling currents derived from said resistive impedance over said calling line, switch controlled contacts controlled by said motor for dissipating the energy in said resonant circuits between successive connections established from said distributor to said manually settable devices.

References Cited in the file of this patent

UNITED STATES PATENTS

| | | |
|---|---|---|
| 2,228,113 | Hersey | Jan. 7, 1941 |
| 2,588,397 | Lovell et al. | Mar. 11, 1952 |